United States Patent
Gu et al.

(10) Patent No.: US 11,256,659 B1
(45) Date of Patent: Feb. 22, 2022

(54) SYSTEMS AND METHODS FOR AGGREGATING AND DISPLAYING DATA FROM MULTIPLE DATA SOURCES

(71) Applicant: MASSACHUSETTS MUTUAL LIFE INSURANCE COMPANY, Springfield, MA (US)

(72) Inventors: Xiangdong Gu, Springfield, MA (US); Marcy Daniels, Springfield, MA (US); Phillip Titolo, Springfield, MA (US); Sarah Porter, Springfield, MA (US); Dana Gould, Springfield, MA (US); Swati Rathore, Springfield, MA (US); Grace Yoo, Springfield, MA (US); Jia Geng, Springfield, MA (US); James Wallace, Springfield, MA (US); Jessica Dusseault, Springfield, MA (US); Michael Bessey, Springfield, MA (US)

(73) Assignee: MASSACHUSETTS MUTUAL LIFE INSURANCE COMPANY, Springfield, MA (US)

(*) Notice: Subject to any disclaimer, the term of this patent is extended or adjusted under 35 U.S.C. 154(b) by 58 days.

(21) Appl. No.: 16/803,844

(22) Filed: Feb. 27, 2020

Related U.S. Application Data

(60) Provisional application No. 62/811,480, filed on Feb. 27, 2019.

(51) Int. Cl.
*G06F 16/11* (2019.01)
*G06F 16/14* (2019.01)

(52) U.S. Cl.
CPC .......... *G06F 16/116* (2019.01); *G06F 16/144* (2019.01); *G06F 16/148* (2019.01)

(58) Field of Classification Search
CPC ............... G06F 16/258; G06F 16/2471; G06F 16/2228; G06F 16/254; G06F 21/78; G06F 3/0481; G06F 16/25; G06F 16/84
See application file for complete search history.

(56) References Cited

U.S. PATENT DOCUMENTS

| | | | | |
|---|---|---|---|---|
| 2005/0086360 A1* | 4/2005 | Mamou | ................. | G06F 16/254 709/232 |
| 2007/0165625 A1* | 7/2007 | Eisner | ................. | G06Q 20/223 370/389 |
| 2007/0245013 A1* | 10/2007 | Saraswathy | ......... | H04L 43/0811 709/223 |
| 2010/0205206 A1* | 8/2010 | Rabines | ................ | G06F 16/338 707/769 |
| 2018/0253669 A1* | 9/2018 | Thunoli | ............... | G06Q 10/067 |

\* cited by examiner

*Primary Examiner* — Angelica Ruiz
(74) *Attorney, Agent, or Firm* — Foley & Lardner LLP

(57) ABSTRACT

Systems and methods for collecting and aggregating data from multiple data sources on a real-time basis in an organized manner that can be stored, distributed, published, analyzed, and retrieved in various different formats and for different purposes is described. The methods include providing a user with reports and insights created by consolidating all data records and activity into a single data record generated by a common data model.

20 Claims, 3 Drawing Sheets

SYSTEMS AND METHODS FOR AGGREGATING AND DISPLAYING DATA FROM MULTIPLE DATA SOURCES

CROSS-REFERENCE TO RELATED APPLICATIONS

This application claims priority to U.S. Provisional Patent Application Ser. No. 62/811,480, filed Feb. 27, 2019, which is incorporated herein by reference in its entirety.

TECHNICAL FIELD

The subject matter described herein relates generally to data processing systems, and more specifically towards systems and methods for enterprise data collection, analytics, and publishing from various data-generating systems.

BACKGROUND

Data records generated by data-generating systems of various entities are stored according to various company-specific or product-specific data formats. Stakeholders, such as service providers, utilize software applications to generate various products by consuming all these variants of data formats or customized data formats that are not openly available. Furthermore, these data records are often fragmented and continue to increase in number. Consequently, the service providers do not have access to an accurate form of these comprehensive datasets that are necessary to generate various products for their customers.

SUMMARY

What is therefore desired are systems and methods for collecting and aggregating data from multiple data sources on a real-time basis in an organized manner that can be stored, distributed, published, analyzed, and retrieved in various different formats and for different purposes. What is further desired are systems and methods that provide a dashboard for display of aggregated data in a curated format.

Disclosed herein are systems and methods capable of addressing the above-described shortcomings and may also provide any number of additional or alternative benefits and advantages. As described herein, embodiments of the present disclosure relate to systems and methods for collecting data files from a plurality data-generating systems that generate and store data in various data model regimes, many of which are not standardized or are variants of a standard. The stored data may then be used to provide a plurality of customized execution environments and graphical user interfaces (GUIs) to users, based on each user's requirements.

In one embodiment, a computer-implemented method may include receiving, by a computer, a set of data files from one or more data-generating systems configured to generate each data file according to data models associated with a format and a data type; transforming, by the computer, the set of the data files received from the one or more data-generating systems according to a common data model mapping the format of each data file to a single format and a single data type; parsing, by the computer, a transformed set of data files to identify a set of data records and a set of data fields; associating, by the computer, the set of data records to the set of data fields; identifying, by the computer, a data gap corresponding to missing data in the transformed set of data files, wherein the computer identifies the missing data based on an output of the association between the set of data records and the set of data fields; generating, by the computer, an action item corresponding to the data gap, wherein the action item is programmed to be executed within a predetermined period of time; in response to execution of the action item within the predetermined period of time, querying, by the computer, the one or more data-generating systems to retrieve the missing data; transforming, by the computer, the missing data according to the common data model mapping the format of the missing data to the single format and the single data type; and transmitting, by the computer, the missing data and the set of data files to a user computing device to render a dashboard presenting the missing data and the set of data files in a curated format.

In another embodiment, a system may include a computer configured to receive a set of data files from one or more data-generating systems configured to generate each data file according to data models associated with a format and a data type; transform the set of the data files received from the one or more data-generating systems according to a common data model mapping the format of each data file to a single format and a single data type; parse a transformed set of data files to identify a set of data records and a set of data fields; associate the set of data records to the set of data fields; identify a data gap corresponding to missing data in the transformed set of data files, wherein the computer identifies the missing data based on an output of the association between the set of data records and the set of data fields; generate an action item corresponding to the data gap, wherein the action item is programmed to be executed within a predetermined period of time; in response to execution of the action item within the predetermined period of time, query the one or more data-generating systems to retrieve the missing data; transform the missing data according to the common data model mapping the format of the missing data to the single format and the single data type; and transmit the missing data and the set of data files to a user computing device to render a dashboard presenting the missing data and the set of data files in a curated format.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate an embodiment of the subject matter described herein.

DETAILED DESCRIPTION

Figure 1A:
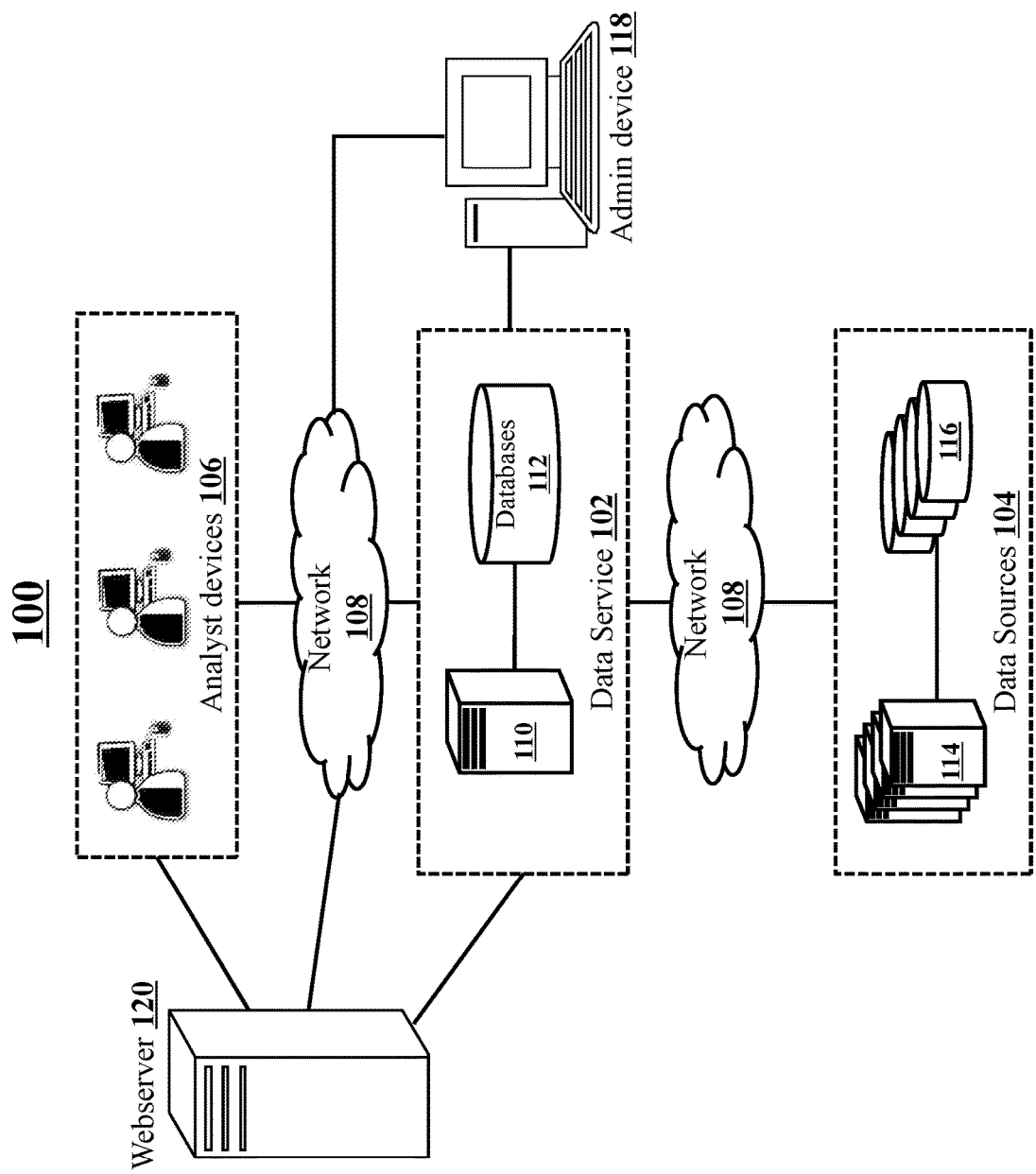
FIG. 1A shows components of a data processing system, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here. Reference will now be made to the exemplary embodiments illustrated in the drawings, and specific language will be used here to describe the same. It will nevertheless be understood that no limitation of the scope of the subject matter is thereby intended. Alterations and further modifications of the inventive features illustrated here, and additional applications of the principles of the subject matters as illustrated here, which would occur to one skilled in the relevant art and having possession of this disclosure, are to be considered within the scope of the subject matter.

Disclosed are systems, methods, and products for collecting, organizing, analyzing, storing, and publishing content and data points on a real-time basis based on multiple inputs and postings from different data-generating systems. These methods include executing various algorithms to collect data files from multiple different data-generating systems containing various data fields and data types. A processor may execute a machine learning algorithm to examine all the data files to identify any data gaps (for example, old types or new types of data gaps), which the processor eliminates by collecting additional and necessary data before data analysis of all or portion of the data files. Analyst computers may query and fetch these updated and completed data records from a database, and then generate and display reports and insights on a dashboard of a user computing device. These methods ensure that a user operating the user computing device is provided with accurate information on the dashboard all the time to maximize risk prevention.

FIG. 1A shows components of a data processing system 100, which may include a data service 102, data sources 104, and analyst devices 106. The data service 102, the data sources 104, and the analyst devices 106 are connected to each other through a network 108. The network 108 may include, but is not limited to, private or public local area network, wireless local area network, metropolitan area network, wide-area network, and the Internet. The network 108 may further include both wired and wireless communications, according to one or more standards, via one or more transport mediums. The communication over the network 108 may be performed in accordance with various communication protocols, such as, transmission control protocol and internet protocol, user datagram protocol, and institute of electrical and electronics engineers communication protocols. The network 108 may further include wireless communications, according to Bluetooth specification sets, or another standard or proprietary wireless communication protocol. The network 108 may further include communications over a cellular network, including, for example, a global system for mobile communications, code division multiple access, and enhanced data for global evolution network.

The data processing system 100 is described in a context of computer-executable instructions, such as program modules, being executed by server computers, such as a server 110. The server 110 may operate various software programs and algorithms (for example, a first algorithm). The first algorithm may include a set of programs, objects, components, data structures, etc., which may perform particular tasks. The features of the data processing system 100 may be practiced either in a single computing device, or in a distributed computing environment, where various tasks may be performed by processing devices, which may be linked through the network 108. In the distributed computing environment, the various program modules may be located in both local and remote computer storage media including memory storage devices.

The data processing system 100 may operate in a local computing environment where the server 110 may generate and execute various tasks. The database 112 and application programs managed by the server 110 may be stored and executed on local computing resources. The data processing system 100 may operate in a cloud-computing environment where the server 110 may be cloud-optimized. The server 110 may generate and execute the tasks. The database 112 and the application programs may be stored and executed on a remote cloud-based server 110 accessed over a network cloud.

A data service 102 may include one or more servers 110 and one or more databases 112. The databases 112 may include a first database configured to store data (such as financial data) received from various data sources 104, and a second database configured to store profiles of users (such as clients/customers). In some embodiments, a single database 112 may be configured to store the data received from the data sources 104 and the profiles of the clients/customers. The server 110 may receive the data of various data types over one or more networks 108 from the data sources 104 where each data source 104 may include a data source device 114 (for example, a data-generating system) and/or a data repository 116. In operation, the server 110 of the data service 102 may receive the data from the variety of data sources 104 over the one or more networks 108. The server 110 may standardize the received data according to a common data model. The server 110 may store the standardized data into a database 112. The server 110 may execute analytics processes on the standardized data. The server 110 may transmit the standardized data over the network 108 to an analyst device 106. The analyst device 106 may present data reports and insights (such as financial data reports and investments plans) through various interactive graphical user interfaces (GUIs) to an end user on GUI display of their computing device, in accordance with the particular function or application executed by the analyst device 106.

Figure 1B:
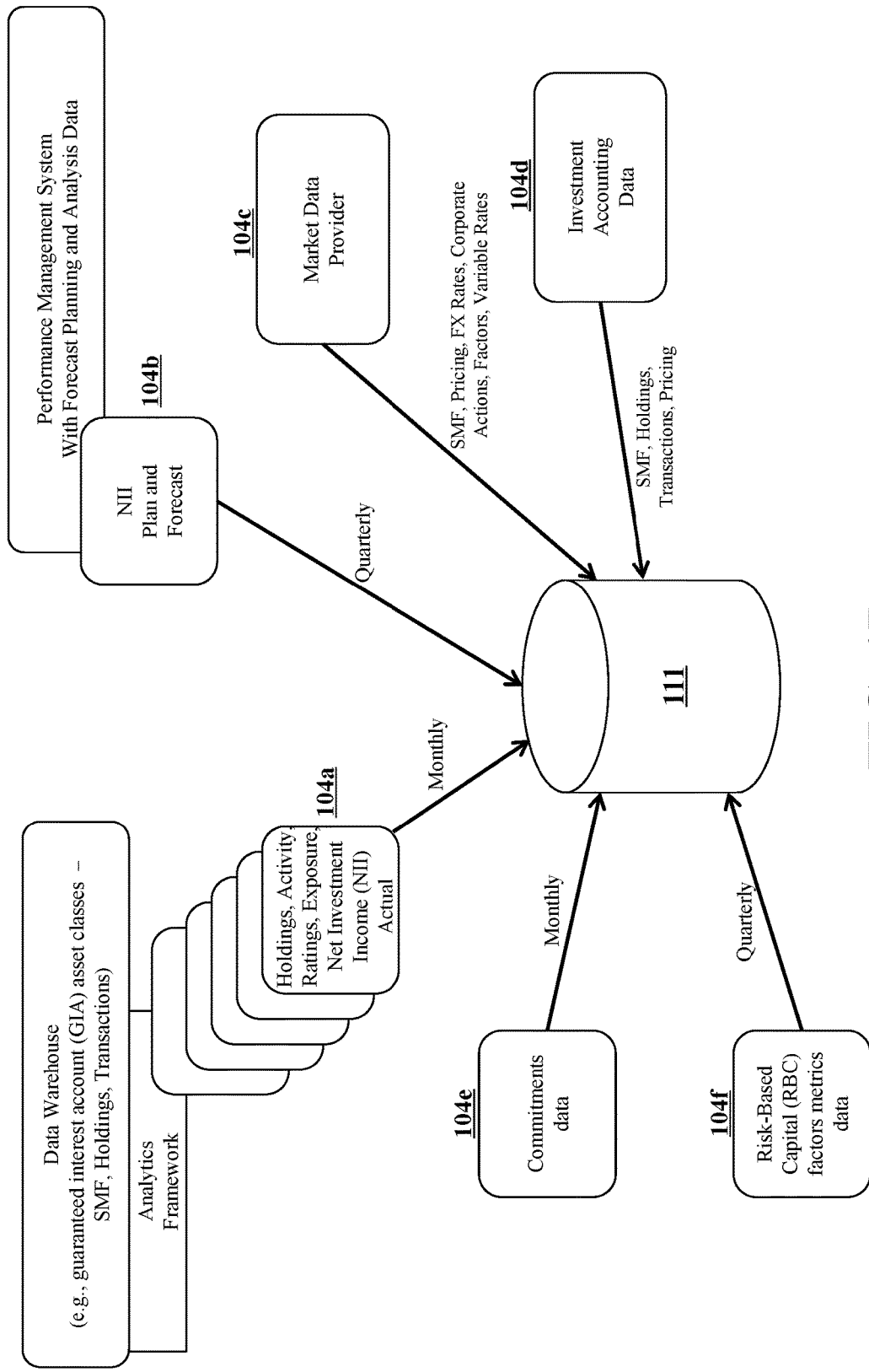
FIG. 1B shows data sources of a data processing system, according to an embodiment.

The data service 102 may receive data from a variety of data sources 104. The data service 102 may transform the arriving data into a standardized data model that may be used to generate various GUIs or certain analytical data values resulting from various analytical algorithm models. A server 110 may execute the analytical algorithm models. In some cases, the data service 102 may generate and transmit a request to an administrator on an admin device 118 to receive the data. Then the admin device 118 may provide the data service 102 access to the data sources 104 for obtaining the data. In some embodiments, the data service 102 may generate and transmit a request to an analyst on an analyst device 106 to receive the data. Then the analyst device 106 may provide the data service 102 access to the data sources 104 for obtaining the data. In response to the request, the analyst device 106 may access the data sources 104 for obtaining the data, and then transmit the data to the data service 102. The data regarding financial information may be received and/or collected from diverse data sources 104 (as depicted in FIG. 1B) including, but not limited to assets data 104a, plan and forecast data 104b, market data 104c, investment account data 104d, commitments data 104e, and RBC data 104f.

The data collected from diverse data sources 104 is organized into an individual record (such as a profile for each investment product) for a type of financial investment. For instance, a server 110 may generate the records for different type of investment products that is compiled using the incoming data received from the data sources 104. In some embodiments, the server 110 may receive the data from the data sources 104 and then convert the inbound data from a source data model, of the data source 104, to a standardized model employed by the various components of the data service 102. In order to convert the incoming data, the server 110 may execute application programming interfaces (APIs) that map the data fields of the inbound data to the data fields of the standardized model. For instance, the data arriving from the data source 104 employing financial service programs may provide inbound data having a first data model. The server 110 may convert the inbound data to the standardized model, and store into the database 112. In one example, the server 110 may collect data from the data sources 104 that may be integrated with universal financial concept codes of the standardized model to allow the data to be encoded under specific financial investment concepts. In some cases, the server 110 may capture, share, and aggregate the data collected from the data sources 104 in a consistent manner by the standardized model universal financial concept codes terminology. The terminology may contain hierarchically specified financial concepts, each with unique meanings and logic-based definitions. Additionally, the financial concepts may have distinct relationships that support reliability and consistency for the data retrieval from the data sources 104. As used herein, the universal financial concept codes corresponds to a standardized data model language that enables a consistent way of indexing, storing, retrieving, formatting, and aggregating the data across specialties and sites of financial entities obtained from the data sources 104. Each universal financial concept code is a unique identifier indicative of a node in a hierarchy of financial concepts to which other types of data obtained from the data sources 104 can be mapped.

A server 110 may be a computing device comprising a processor and non-transitory machine-readable storage media storing software modules that instruct the processor to execute the various processes and tasks described herein. Non-limiting examples of the server 110 may include a workstation computer, a server computer, a laptop, and a tablet device. For ease of explanation, FIG. 1A shows a single computing device functioning as the server 110. However, it should be appreciated that some embodiments may comprise any number of the servers 110 capable of performing the various tasks described herein.

The server 110 may receive data files from various types of data sources 104. The data files may be log files or machine-readable code containing various data fields describing financial data and sources of data associated with the financial data. The server 110 may generate a notification upon receiving the data from the data sources 104. The data fields of the data may contain data fields associated with financial data, and sources of data associated with the financial data, such as data fields describing a data source device 114 in the data sources 104. Upon receiving the data, the server 110 may associate the data with a type of investment plan based on the data fields of the data. The data may contain a data field indicating an investment identifier value that is unique to a type of the investment (such as stocks, life insurance policy, or mutual funds). The server 110 may then store the data into the database 112. Simultaneously or at some other time, the server 110 may generate or update a record (such as a profile and/or a summary) for each type of investment (such as a financial investment plan), which is a log file or any other machine-readable code containing data fields that are populated with data that is based on the data associated with the same investment identifier. Regardless of the number and volume of the data received for the investment identifier from the data-generating systems and the data sources 104, the database 112 contains only a single record for the particular investment product.

In operation, the server 110 may execute software modules (e.g., APIs, web hooks, and web sprockets). The software modules are configured to consume (e.g., retrieve/pull, receive), from various data sources 104, inbound data (such as investment information datasets). The inbound data is then parsed, and reconstructed into the standardized data model format of a data service 102. The interface software modules are configured to receive or pull the data from particular data sources 104, as required by the particular data source 104. In some cases, the data source 104 may be configured to transmit a set of data at regular interval, using a data transfer protocol (e.g. FTP, SFTP). Using the inbound data received from the various data sources 104, the software modules may then generate records for all the data in a database 112. Data models may define the data fields of inbound data and/or the data fields of the standardized data model, allowing the server 110 to map incoming data models associated with the data to the standardized data model of the data service 102. In some implementations, an inbound interface software module of the server 110 may compare certain fields of two inbound data files arriving from disparate data sources 104, to determine whether the two inbound data files are related to a same type of financial investment product. The server 110 may determine whether a new inbound data file is related to a same type of financial investment product of an existing investment plan record previously stored in the database 112. The server 110 may execute analytics algorithms that may perform a number of analytics algorithms, such as cross-referencing data, and correlating data, and/or performing any number of metrics calculations, using data stored in the databases 112.

The data service 102 may include databases 112 that may be hosted on computing devices, such as server computers, workstation computers, laptops, mobile devices, and tablets. The databases 112 may store information including data fields that are associated with particular clients/customers, financial institutions (e.g., insurers), analysts, administrators, and financial service providers. In some embodiments, the server 110 may parse certain data fields of an inbound data file into distinct groups or fields of the data files within the database 112 in accordance with the standardized model, as indicated by the execution of the API. It should be appreciated that, although the data system 100 shows only one database 112, however the data service 102 may include any number of the databases 112, hosted on any number computing devices, which may be any computing device comprising a non-transitory machine-readable storage medium and capable of performing the various tasks described herein.

The server 110 is coupled to the various data sources 104 via internal or external networks 108. The server 110 may execute various processes on incoming data files received from the data sources 104, such as data field formatting and generating a record (such as a profile) for each type of investment product corresponding to each of the incoming data files. The record for each type of investment product corresponds to an application such as a financial investment application, and contains various fields that are associated with instances of the application. The server 110 initially populate the record with information provided from the data sources 104 and other sources. After the record for each type of investment product is initially populated, the server 110 assigns status values to the fields in the record. The server 110 may execute instructions to indicate a status of fields in the record stored in the database 112. In some cases, the server 110 automatically assigns a status to each field in the record. To automatically assign status values to fields in the record for each type of investment product, the server 110 compares the data stored in each field to other data associated with the type of investment product. In some cases, a format of the data provided in each field may be defined. For instance, all financial numbers in the data should be in US dollars. The server 110 may obtain a set of rules reflecting the format from the database 112. The server 110 in turn can automatically assign status values to fields in the record for each type of investment product based on the rules. For instance, the server 110 may assign a value of missing data to any field where data is expected and is not there, a status of incorrect data to any field where the data provided does not conform to an expected value, a status of incomplete data where data entered is only partial, or by any other status that could be predefined.

The server 110 may execute a set of scenario attribute models on a record for each type of investment product to determine whether a data gap is present within the record. Scenario models may be computer files stored on the server 110 or separate database device, such as the database 112, and comprise a set of attributes that indicate a type of potential data gap. Upon the execution of the scenario models, the server 110 may identify data field entries in the record for each type of the investment product to determine one or more matches to corresponding attributes in the scenario models. In one example, the server 110 upon parsing and/or processing the incoming data files may identify a data gap where the server 110 may determine that a monthly financial report file does not include information for one week. In such a case, the server 110 may generate a flag for potential gap or missing information regarding the one week missing information. In another example case, the server 110 on parsing and/or processing the incoming data files may identify a data gap where a particular data file mentions a presence of sources of websites to look for additional information, but the server 110 did not identify the presence of sources of websites to look for additional information upon parsing the particular data file. In such a case, the server 110 may generate a flag for potential gap or missing information regarding the potential missing sources of the websites.

The server 110 stores a record of the missing information in a database 112. The server 110 uses the missing information record to determine what follow up action items are to be executed. For instance, the server 110 may generate an alert upon identifying the missing information in processed data files. The server 110 may further determine how to obtain the required missing information from the various data sources 104. The server 110 may transmit a notification to another server of a centrally hosted system 100 specifying relevant missing data fields, a status of the missing data fields, and how the missing information shall be recovered. The notification may indicate that several different data sources 104 and/or other external databases have to be queried to obtain the missing information. Another server may then transmit content of the notification and a request to all the different sources of data, such as different data-generating systems, and thereby minimizing the hassle for the administrators to provide missing information to rectify the data gaps.

The server 110 may query different data source devices 114 and/or data repository 116 on a regular basis and/or in response to indication of missing information, and retrieves the missing information about the missing data fields that require follow up action. The server 110 may use a status of the missing data fields to generate a request, which is then sent to a data source device 114. The server 110 may also solicit the missing information electronically, through an email, chat, or other web-based request. The request may be automatically formulated and/or may be created, and transmitted to the data source device 114 through an interface. The interface may include verification protocols before sending the request to the data source device 114. The request may include a web link to a secure webpage or a data object that can be populated, saved, and returned to the server 110. For example, the webpage contains the missing data fields and spaces to electronically fill in the missing data. The webpage may be provided with options for communicating with the server 110, for instance, including by sending an email message or initiating a chat. The webpage may further include various web links to information about the requested missing information, and an option to provide a comment for any of the missing data fields. The server 110 may include a computer software for formulating a request coupled to an output interface for transmitting the request to the data source device 114. In the case of the request transmitted to the data source device 114, a textual or voice messaging capabilities may be used to formulate a message. The message may solicit a touch-tone response which is detected and recorded by the data server 110, or a verbal response that is recorded by the server 110. If the data source device 114 does not respond within a predetermined period of time, or a response is incomplete or prompts further inquiry, a reminder or follow-up request may be transmitted to the data source device 114. Once the correct and accurate data for the missing field has been supplied by the data source device 114, the server 110 may remove the missing data tag from a record of a given investment product. The server 110 may update the record with the missing information provided by the data source device 114, and store the updated record in the database 112. The server 110 may perform additional calculations or assessments based on information stored in the updated record in the database 112. Once the record is complete and accurate, the server 110 may then generate various investment products based on the information within the records. The server 110 may then output an application or form corresponding to the various investment products to an analytical engine of the system 100 for further processing. The analytical engine may apply analytical models on the records stored in the database 112 to calculate financial investment reports and insights for an analyst, which may then be electronically transmitted to the clients/customers.

Data Sources 104 may include a number of computing devices or machine-readable computer files providing a data service 102 with inbound data files in any number of data formats and data types. For example, the data source 104 may be an application server that generates files (i.e., inbound data files) according to a particular data model of a data service application. In some cases, the inbound data files may be transmitted to the server 110 over any number of internal and external data networks 108. As another example, the data source 104 may include a data repository 116 storing data files according to a number of data formats (e.g., WL, JSON, RSS, SQL, text file, RSS) and/or data models, and may be transmitted to the server 110 and/or may be fetched by the server 110 based on a triggering condition (e.g., time-based periodic updates, real-time updates). In some cases, the data source 104 may include devices of financial institutions, such as an insurance provider server, storing records of financial events, financial history, financial insured coverage, and the like, in a format of the financial institution.

The data sources 104 may include application servers and data source devices 114 executing financial service applications that generate electronic data files having a prescribed data model associated with a particular financial application. The data sources 104 may include a data repository 116 containing data files stored in an electronic format on server computers, or other non-transitory machine-readable storage media. The data source 104 may be configured to provide inbound data files to the data service 102 in a number of ways. For example, in some cases, the data repository 116 may be configured to periodically (e.g., daily) transmit data files via a data transfer protocol (e.g., FTP, SFTP) to the application servers, the data source devices 114, and the data service 102. The data source devices 114 may be a computing device comprising a processor configured to execute a data generation application that produces the data files. Non-limiting examples of the data source devices 114 may include a server computer, a workstation computer, a tablet device, and a mobile device (e.g., smartphone, PDA).

An analyst device 106 may be a computing device comprising a processor configured to execute a web browser application that accesses data, reports, and insights generated using the data from a data service 102. Non-limiting examples of the analyst device 106 may include a server computer, a workstation computer, a tablet device, and a mobile device (e.g., smartphone, PDA). The analyst device 106 may execute a software application for manipulating or updating the data stored in a database 112. For example, an analyst may use a computer device configured to access processed data that they have been granted access to, and having a predefined data model. A server 110 may structure and output to the analyst device 106 portions of the requested processed data stored in the databases 112 according to the particular function requested by the analyst device 106.

The analyst device 106 is a computing and/or telecommunication device capable of performing the various tasks and processes described herein, such as accessing a webserver 120 and providing a GUI interface to an analyst to interact with a website hosted on the webserver 120. In other words, the analyst device 106 may allow the analyst to interact with a server 110 via the webserver 120. The analyst device 106 may execute an Internet browser or a local web application that accesses the webserver 120 in order to issue requests or instructions to the server 110 to access a system 100. The analyst device 106 may transmit credentials from analyst inputs to the webserver 120, from which the webserver 120 may authenticate the analyst. One having skill in the art would appreciate that the analyst device 106 may comprise any number of input devices configured to receive any number of data inputs (e.g., mouse, keyboard, touchscreen, stylus), including various types of data inputs allowing for authentication, e.g., analyst name, passwords, certificates, biometrics. One having skill in the art would also appreciate that the analyst device 106 may be any computing device comprising a processor and non-transitory machine-readable storage medium allowing the analyst device 106 to perform the various tasks and processes described herein.

As an example of an analyst device 106 operation, the analyst device 106 may execute an Internet browser that accesses the webserver 120 hosting a website such as a financial service application that allows for the analyst to access the consolidated and processed data files such as the financial data and/or reports. Using the analyst device 106, the analyst may interact with various financial data published on the website and/or financial application. The analyst device 106 of the analyst may be used upload machine-readable computer files (e.g., PDF, DOC, XSL) containing financial and investment information. The computer files may be stored into document records in the database 112. The analyst device 106 may issue queries or instructions to the server 110 via the webpages generated by the webserver 120, which may then instruct the server 110 to perform various tasks, such as retrieving or updating a data file from the database 112.

A webserver 120 is a computing device hosting a website accessible to an analyst device 106 via an Internet. The webserver 120 is the computing device comprising a processor and non-transitory machine-readable storage capable of executing the various tasks and processes described herein. Non-limiting examples of the computing devices may include workstation computers, laptop computers, server computers, laptop computers, and the like. While the system 100 includes a single webserver 120, one having skill in the art would appreciate that in some embodiments the webserver 120 may include any number of computing devices operating in a distributed computing environment.

The webserver 120 may execute software applications configured to host a website (e.g., Apache®, Microsoft IIS®), which may generate and serve various webpages to the analyst device 106. The website may be used to generate and access data such as financial data stored on a database 112. The webserver 120 may be configured to require an analyst authentication based upon a set of analyst authorization credentials (e.g., analyst name, password, biometrics, cryptographic certificate). In such implementations, the webserver 120 may access the database 112 configured to store analyst credentials, which the webserver 120 may be configured to reference in order to determine whether a set of entered credentials purportedly authenticating the analyst match an appropriate set of credentials that identify and authenticate the analyst. Similarly, in some implementations, the webserver 120 may generate and serve webpages to the analyst device 106 based upon analyst membership specifics within a system 100. In such implementations, the analyst profile may be defined by data fields in analyst records stored in the database 112, and authentication of the analyst may be conducted by the webserver 120 by executing an access directory protocol. The webserver may then be instructed to generate webpage content, access or generate data stored in the database 112, according to the analyst membership specifics defined by the analyst record in the database 112.

Databases 112 may be hosted on a server (such as a server 110), and are capable of storing data files (such as financial data) and client user profiles in a plain format and/or an encrypted version containing data fields that are associated with a communication channel and a type of financial data-generating systems. The databases 112 may further store the user records that may include data fields describing customers, e.g., customer data, such as customer credentials (e.g., customer name, passwords, biometrics, encryption certificates), customer account data, customer rules, or customer permissions; document records that may comprise machine-readable computer files (e.g., word processing files), parsed portions of such computer files, or metadata associated with computer files; and application data that may include software instructions executed by the server 110 or data used by the such applications executed by the server 110. The databases 112 may be in communication with a processor of the server 110, where the processor is capable of executing the various commands of the system 100. In some embodiments, the databases 112 may be part of the server 110. In some embodiments, the databases 112 may be a separate component in communication with the server 110.

The data processing system 100 described herein provide a number of advantages over the existing systems. For instance, the data system 100 provides an agnostic system that is able to implement interoperability of discrete financial data files. For instance, the data system 100 can free financial information without a need to standardize the already existing industry practice. Instead of implementing standardization of financial data management, the data system 100 and techniques described herein can efficiently and accurately provide any one financial service server an ability to obtain a comprehensive and accurate record of all financial data files, which may be of different formats and types. The applications for such information are endless and can be applicable not only in the long term financial industry, where the problem of disparate financial data sources is most prevalent, but can also improve the financial information management in an acute financial practice. The data system 100 and methods described herein are able to make available a complete financial data file to dashboard of any device independent of the data system 100 involved, including any desired mobile applications, allow an analyst to run any number of analytics, identify key financial indicators, and view the information in any number of different display modes.

Figure 2:
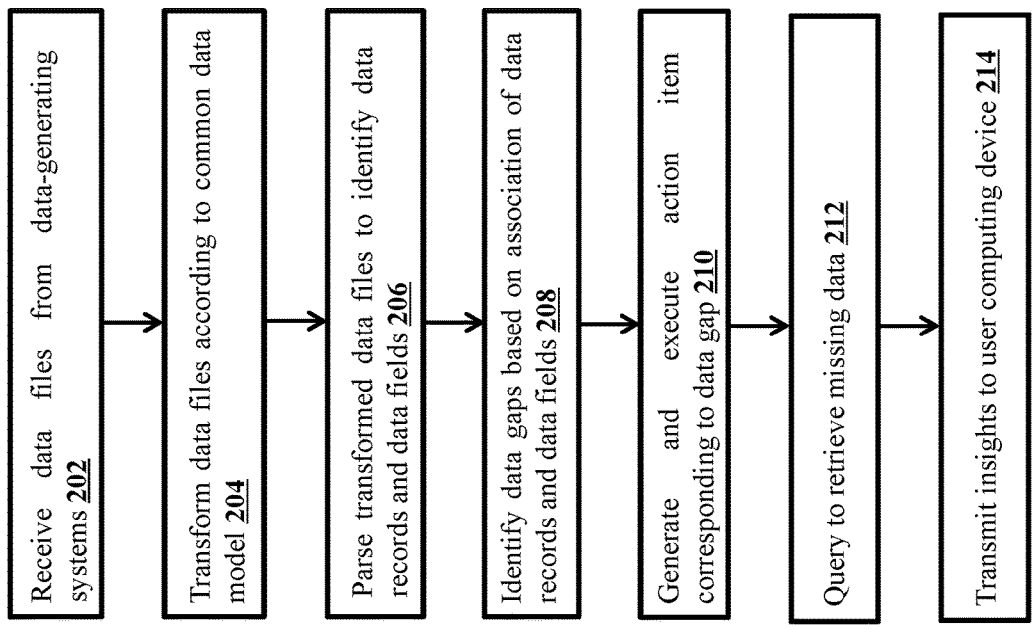
FIG. 2 shows execution of a data processing method, according to an embodiment.

FIG. 2 shows execution steps of a data processing method 200. The data processing method 200 shown in FIG. 2 comprises execution steps 202, 204, 206, 208, 210, 212, and 214. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the exemplary method 200 of FIG. 2 is described as being executed by a single server computer in this exemplary embodiment. However, one having skill in the art will appreciate that, in some embodiments, steps may be executed by any number of computing devices operating in a distributed computing environment. In some cases, a computer executing one or more steps may be programmed to execute various other, unrelated features, where such computer does not need to be operating strictly as the server computer described herein.

In a first step 202, a server computer may receive a set of data files from data-generating systems. The data-generating systems are configured to generate corresponding data files according to one or more data models associated with one or more formats and one or more data types. Each data-generating system is configured to generate the corresponding data file according to a separate type of data model having a separate data type and a separate data format. The server computer may gather the data files from the data-generating systems on a periodic basis. In some cases, the server computer may gather the data files from the data-generating systems on a real-time basis. The real-time basis may be at least as frequent as every five minutes. In some cases, the server computer may handle the data files based at least in part by configuring the data-generating systems to subscribe to a data feed of the data files. The data feed may be adapted to collect data files including information in RSS format, OPML format, or other formats from electronic devices of the data-generating systems and the data sources such as stock market systems, currency systems, forex systems, financial risk systems, or the like.

In a next step 204, a server computer may transform the set of the data files received from the one or more data-generating systems. The server computer may transform the set of the data files according to a common data model mapping the format of each data file to a single format and a single data type. For transforming the data files, the server computer may standardize and/or normalize the data files according to a common data model. The server computer may standardize the data files having one or more formats and one or more data types by mapping a transformation of the formats for all data files having all of the data types to a single format and single data type. The server computer may select the single format and the single data type based on type of content in all the data files. The server computer may also select the single format and the single data type based on configuration of user computing devices.

The server computer upon transforming the data files may then store the transformed data files into a database. The database may store the transformed data files associated with a plurality of identifiers. The server computer may generate a record (such as a profile) associated with each type of investment product (such as a financial investment plan like a mutual fund or a life insurance policy) using the transformed data files stored in the database. The record may include data fields containing information from the transformed data files. For instance, the record may include the information such as current value of stock markets, current currency exchange rates, risk data and indicators obtained from the transformed data files.

In a next step 206, a server computer may parse the transformed data files to identify a set of data records and a set of data fields. The server computer may then associate the set of data records to the set of data fields.

In a next step 208, a server computer may identify a data gap corresponding to missing data in the transformed data files. The server computer may identify the missing data based on an output of the association between the set of data records and the set of data fields. The missing data may correspond to any missing information, incomplete information, or incorrect information within the transformed data files. In one example, the server computer on examining the transformed data files may identify the data gap where a monthly report received from a data source does not include data for several days. In such a case, the server computer may generate a flag for potential gap regarding information not available for several days. In another example, the server computer on examining the transformed data files may identify the data gap where some of the information within the transformed data files may not be in English language. In such a case, the server computer may generate a flag for the potential gap regarding translation errors. The server computer stores records of all potential gaps in the database, and is used by the server computer to determine what follow up actions need to be taken to resolve the data gaps.

In a next step 210, upon identification of the data gaps, the server computer may generate action items corresponding to gathering of the missing information to rectify the data gaps. The server computer may program each action item to be performed within a predetermined period of time. The server computer may then determine a predetermined period of time during which each action item has to be executed. The server computer may determine the predetermined period of time based on availability of resources, a type of data gap, analysis of missing content, etc. The server computer may determine source devices, which may be tasked with executing the action items to find the missing information and rectify the data gaps. Upon the determination of the source devices, the server computer may trigger a monitoring window to measure a time period from a point of determination of the source devices until the predetermined period of time elapses for each action item to be executed. During the monitoring window, the server computer periodically checks whether a record of execution of each action item by each source device is either available from one or more data-generating systems, which may be associated with the source devices or has been received in a database from the one or more data-generating systems. In some cases, the server computer may locate a notification record of the execution of the actions items by the source devices in the database, or request the notification record from the source devices or the data-generating systems.

The server computer may generate a request for an analyst device to execute the action items to find the missing information and rectify the data gaps. The server computer may provide the administrator device with a message regarding the missing information within the request. The message may include a deadline date and time schedule to execute the action items and rectify the data gaps. The server computer may communicate (through wired or wireless communication platform) with the analyst device to determine a deadline date and time schedule for the administrator device to execute the action items and rectify the data gaps. The server computer may request the administrator device for additional information by populating fields marked as incomplete or missing in a webpage displayed on the administrator device as part of the request. If the administrator device does not respond within a predetermined period of time and/or a response is incomplete or prompts further inquiry, a reminder or follow-up request may be provided to the administrator device to provide the correct missing information.

In a next step 212, a server computer via the source device and/or the administrator device may query the data-generating systems to retrieve the missing data, in response to execution of the action item within the predetermined period of time. The server computer may then receive the missing data. The server computer may then transform the missing data according to the common data model mapping the format of the missing data to the single format and the single data type. The missing data is transformed in a same format and same data type as of all other data received.

The server computer may update a record associated with each type of investment product with the transformed missing data. Once the record is complete, the server computer may then output the complete information within the record to an analyst device to generate reports and insights. The server computer may also execute artificial intelligence (AI) models to perform additional calculations or assessments based on information stored in updated records to generate the reports and/or insights for its analysts and customers, and then transmit the reports and/or insights to other computers such as analyst computers. In some cases, the server computer may generate the reports and/or insights by selecting different elements to display in the reports and/or insights. The server computer may organize various elements in a hierarchy, divisible into sub-elements or having other selectable attributes where an element may represent a collection or aggregation of information that can be defined by their values for a particular dimension. The examples of hierarchical elements include a revenue element comprising a collection of revenue information that all have values of a revenue dimension meeting certain criteria (e.g., revenue greater than a certain amount), etc. The reports and/or insights may include a graphical representation or depiction of financial and other information such as tables, charts, graphs, or other methods of disseminating information. For example, the reports may include a graph with stock values assigned to a vertical axis, and time values assigned to a horizontal axis, a chart of annual revenue values recorded for various companies, a table of risk factors recorded for different type of investments, etc. In some cases, the reports and/or the insights may also include simulations and heat map of data points that correspond to relevant financial indicators.

In a next step 214, a server computer may transmit complete set of data to a user computing device to render a dashboard presenting the complete set of data in a curated format. The complete set of data may then be displayed on a GUI of the user computing device. The user computing device may further include a tool such as an insight tool that a user may drag and drop over any feature displayed in the complete set of data to display additional information regarding the feature. Upon the selection of the feature using the insight tool, the features not within the insight view may shrink to provide enough space for those features focused upon by the insight view. The shrinking may correspond to adjustment of one or more dimensions of a report being displayed, the scale of dimensions included in the report, and the relative sizing of features included in the report with respect to other features included in the report. The insight tool may also allow the users to save the portions of the report presented in one or more insight views using the insight tool. For instance, the portions of the report may be saved as a new report for future reference. The reports may be dynamic such that any changes in information in any of the reports at a backend may be highlighted in the reports displayed on a GUI, and/or an alert may be transmitted to the users that the reports have been updated. The reports may be updated at a backend by a server computer when there is any change in datasets that were used as a raw material to initially generate the reports.

The user computing device may include input/output devices to allow the user interaction with programs to communicate with a data system to generate financial service investment products using the reports. The user may have a financial service application installed on their computing device from which the user access and interact with the system to receive and interact with the reports, generate investment products, and then perform transactions. The financial service application may be a software stack running on an operating system (OS) of the user computing device. The financial service application of the data system may have a protocol layer and a user interface layer ("UI") where each layer may be responsible for specific functions. The protocol layer of the financial service application of the data system may communicate with the OS of the analyst device, and manages the connections of the user computing device over a communication network. The protocol layer may also communicate with the user interface layer and may be arranged to control the user interface layer to present information such as reports to the user via the user interface of the financial service application on the user computing device, and to receive information from the user such as investment plans via the user interface of the financial service application on the user computing device.

The user computing device may run a web browser that accesses and presents the financial service application to be executed by a processor of the user computing device, and allows the user to generate the investment products. The user computing device may execute a financial service application outside of a web browser, for example, an operating system-specific financial service application that accesses information such as reports processed by a processor of a server to generate the investment products. The user computing device may transmit the investment products to clients on their computing devices, which may be displayed on a GUI of computing devices of the customers. The investment products may include a graphical representation of each of one or more categories of investment products, and each category of investment product may be made up of one or more sub-plans. The graphical representations may be a table containing all the categories and all the different type of investment products in each category.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present subject matter.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the subject matter. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present subject matter. Various modifications to these embodiments will be readily apparent to those skilled in the art, and the generic principles defined herein may be applied to other embodiments without departing from the spirit or scope of the subject matter. Thus, the present subject matter is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:
receiving, by a computer, a set of data files from one or more data-generating systems configured to generate each data file according to data models associated with a format and a data type;
generating, by the computer, a transformed set of data files by transforming the set of the data files received from the one or more data-generating systems according to a common data model mapping the format of each data file to a single format and a single data type;
parsing, by the computer, the transformed set of data files to identify a set of data records and a set of data fields;
associating, by the computer, the set of data records to the set of data fields;
identifying, by the computer, a data gap corresponding to missing data in the transformed set of data files, wherein the computer identifies the missing data based on an output of the association between the set of data records and the set of data fields;
determining, by the computer, a time period in which the data gap should be rectified based on a type of the missing data and an identified source of the missing data;
generating, by the computer, an action item corresponding to the data gap, wherein the action item is programmed to be executed within the time period;
in response to execution of the action item within the time period, querying, by the computer, the one or more data-generating systems to retrieve the missing data;
transforming, by the computer, the missing data according to the common data model mapping the format of the missing data to the single format and the single data type; and
transmitting, by the computer, the missing data and the set of data files to a user computing device to render a dashboard presenting the missing data and the set of data files in a curated format.

2. The computer-implemented method according to claim 1, further comprising selecting, by the computer, the common data model based on a configuration of the user computing device.

3. The computer-implemented method according to claim 1, wherein each data file of the set of the data files comprises machine-readable code containing a data field and a source of data associated with a source identifier.

4. The computer-implemented method according to claim 1, wherein the common data model is selected by an administrator.

5. The computer-implemented method according to claim 1, further comprising pre-processing, by the computer, the set of the data files to generate a set of pre-processed data files.

6. The computer-implemented method according to claim 1, further comprising normalizing, by the computer, the set of the data files to generate a set of normalized data files.

7. The computer-implemented method according to claim 1, further comprising storing, by the computer, the transformed set of data files into a database configured to store a plurality of data files associated with a plurality of data-generating system identifiers.

8. The computer-implemented method according to claim 1, wherein transforming the set of the data files according to the common data model comprises converting all formats for the set of data files having all data types to the single format and the single data type.

9. The computer-implemented method according to claim 1, further comprising determining, by the computer, whether a record of execution of the action item is available from the one or more data-generating systems after the time period elapses.

10. The computer-implemented method according to claim 1, further comprising triggering, by the computer, a monitoring window for the time period from determination of the action item until the time period elapses to determine the execution of the action item.

11. A system comprising:
one or more processors coupled to a non-transitory memory, the one or more processors configured to:
receive a set of data files from one or more data-generating systems configured to generate each data file according to data models associated with a format and a data type;
generate a transformed set of data files by transforming the set of the data files received from the one or more data-generating systems according to a common data model mapping the format of each data file to a single format and a single data type;
parse the transformed set of data files to identify a set of data records and a set of data fields;
associate the set of data records to the set of data fields;
identify a data gap corresponding to missing data in the transformed set of data files, wherein the computer identifies the missing data based on an output of the association between the set of data records and the set of data fields;
determine a time period in which the data gap should be rectified based on a type of the missing data and an identified source of the missing data;
generate an action item corresponding to the data gap, wherein the action item is programmed to be executed within the time period;
in response to execution of the action item within time period, query the one or more data-generating systems to retrieve the missing data;
transform the missing data according to the common data model mapping the format of the missing data to the single format and the single data type; and
transmit the missing data and the set of data files to a user computing device to render a dashboard presenting the missing data and the set of data files in a curated format.

12. The system according to claim 11, wherein the one or more processors are further configured to select the common data model based on a configuration of the user computing device.

13. The system according to claim 11, wherein each data file of the set of the data files comprises machine-readable code containing a data field and a source of data associated with a source identifier.

14. The system according to claim 11, wherein the common data model is selected by an administrator.

15. The system according to claim 11, wherein the one or more processors are further configured to pre-process the set of the data files to generate a set of pre-processed data files.

16. The system according to claim 11, wherein the one or more processors are further configured to normalize the set of the data files to generate a set of normalized data files.

17. The system according to claim 11, wherein the one or more processors are further configured to store the transformed set of data files into a database configured to store a plurality of data files associated with a plurality of data-generating system identifiers.

18. The system according to claim 11, wherein transforming the set of the data files according to the common data model comprises converting all formats for the set of data files having all data types to the single format and the single data type.

19. The system according to claim 11, wherein the one or more processors are further configured to determine whether a record of execution of the action item is available from the one or more data-generating systems after the time period elapses.

20. The system according to claim 11, wherein the one or more processors are further configured to trigger a monitoring window for the time period from determination of the action item until the time period elapses to determine the execution of the action item.

* * * * *